(12) United States Patent
Eigner

(10) Patent No.: US 10,875,266 B2
(45) Date of Patent: Dec. 29, 2020

(54) AIRCRAFT REPAIR PATCH APPLICATOR TOOL

(71) Applicant: United Technologies Corporation, Farmington, CT (US)

(72) Inventor: David J. Eigner, Columbia, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 367 days.

(21) Appl. No.: 15/610,777

(22) Filed: Jun. 1, 2017

(65) Prior Publication Data
US 2018/0345608 A1 Dec. 6, 2018

(51) Int. Cl.
| | |
|---|---|
| *B29C 73/12* | (2006.01) |
| *B29C 73/10* | (2006.01) |
| *B29C 73/32* | (2006.01) |
| *B29L 31/08* | (2006.01) |
| *B29L 31/30* | (2006.01) |
| *B29L 31/00* | (2006.01) |

(52) U.S. Cl.
CPC .............. *B29C 73/12* (2013.01); *B29C 73/10* (2013.01); *B29C 73/32* (2013.01); *B29L 2031/08* (2013.01); *B29L 2031/3076* (2013.01); *B29L 2031/7504* (2013.01)

(58) Field of Classification Search
CPC ......... B29C 73/12; B29C 73/10; B29C 73/32; B29L 2031/08; B29L 2031/3076; B29L 2031/7504; B23P 6/002; B23P 6/045
See application file for complete search history.

(56) References Cited

U.S. PATENT DOCUMENTS

| | | | | |
|---|---|---|---|---|
| 4,708,608 | A | | 11/1987 | DiRocco |
| 5,296,173 | A | * | 3/1994 | Dornan ................... B29O 73/34 264/315 |
| 5,975,183 | A | | 11/1999 | Reis et al. |
| 6,332,490 | B1 | * | 12/2001 | Griggs .................. F01D 5/3092 156/580 |
| 2010/0024185 | A1 | * | 2/2010 | Mayabb ................. B29O 73/04 29/402.03 |
| 2016/0017712 | A1 | | 1/2016 | Vontell, Sr. et al. |
| 2017/0021576 | A1 | | 1/2017 | Helfrich et al. |

FOREIGN PATENT DOCUMENTS

| | | | | |
|---|---|---|---|---|
| FR | 2705914 | | 12/1994 | |
| FR | 2705914 | A1 * | 12/1994 | ............. B29C 73/32 |
| JP | 08192484 | A * | 7/1996 | ....... B29C 66/81455 |
| JP | H08192484 | | 7/1996 | |

OTHER PUBLICATIONS

European Search Report for Application No. 18173919.4 dated Oct. 25, 2018.

* cited by examiner

*Primary Examiner* — Abbas Rashid
*Assistant Examiner* — S. Behrooz Ghorishi
(74) *Attorney, Agent, or Firm* — Carlson, Gaskey & Olds, P.C.

(57) ABSTRACT

A repair tool for applying a coating patch includes a heating element, a flexible bladder disposed adjacent the heating element, and an inflexible shell disposed about the flexible bladder. The inflexible shell defines a negative space corresponding to a plurality of sides of an aircraft component. A controller is communicatively coupled to the heating element and the bladder, and is configured to control a temperature of the heating element and a pressure of the flexible bladder.

12 Claims, 3 Drawing Sheets

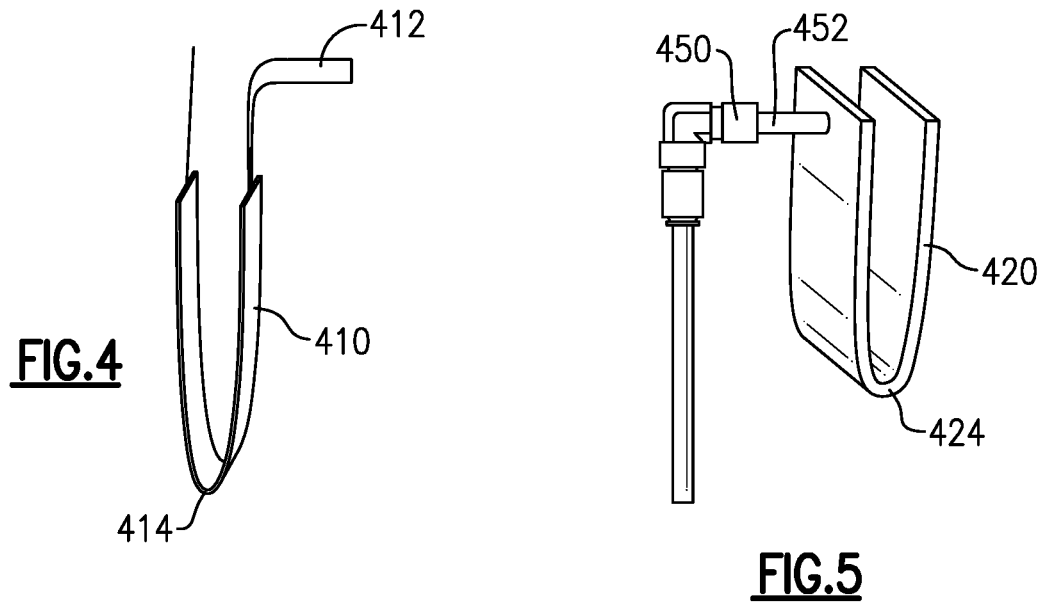
FIG.4
FIG.5
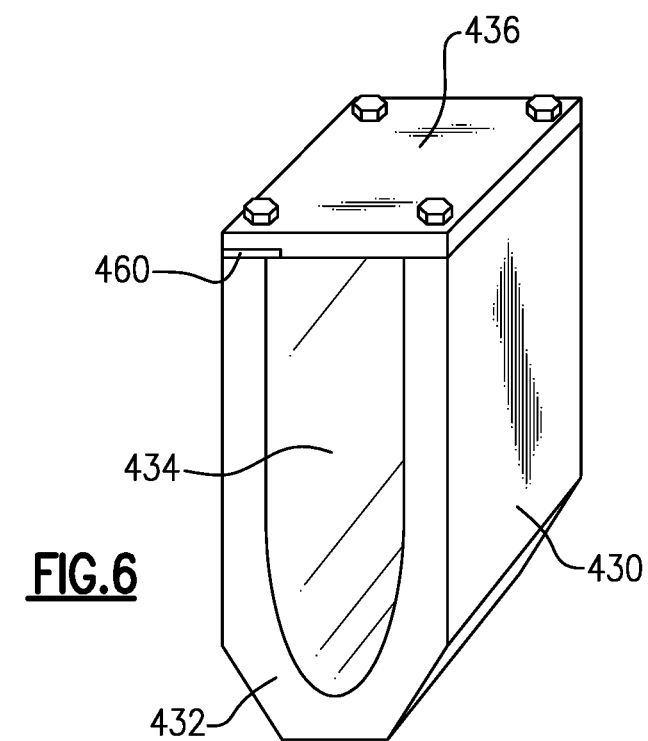
FIG.6

AIRCRAFT REPAIR PATCH APPLICATOR TOOL

TECHNICAL FIELD

The present disclosure relates generally to a tool for applying a repair patch for aircraft component coatings, and more specifically to a tool for applying uniform heat and pressure to a coating patch.

BACKGROUND

Gas powered turbines ingest air at high velocities during operation. The ingestion of air carries with it the ingestion of particulate that is entrained in the air stream. Contact between the particulate and the structural components of the gas powered turbine can result in erosion damage to the contacted surfaces of the component.

In order to minimize erosion damage, structures, and particularly composite structures, include an erosion resistant coating that is applied to the original manufacture. The erosion resistant coating minimizes erosion damage to the underlying component without substantially changing the dimensions of the underlying component. During operation of the engine, the erosion resistant coating is worn down either due to long term erosion, ingested object impacts, or a combination of the two. Further, this wear on the erosion resistant coating is not uniform, and can be substantially higher at certain positions of the component.

As a result of the increased wear at certain positions, it is more efficient to patch the erosion resistant coating at the high wear locations than it is to reapply the entire coating. However, the same features that subject the high wear locations to increased wear make the application of the repair patch more difficult.

SUMMARY OF THE INVENTION

In one exemplary embodiment a repair tool for applying a coating patch includes a heating element, a flexible bladder disposed adjacent the heating element, an inflexible shell disposed about the flexible bladder, the inflexible shell defining a negative space corresponding to a plurality of sides of an aircraft component, and a controller communicatively coupled to the heating element and the bladder, the controller being configured to control a temperature of the heating element and a pressure of the flexible bladder.

In another example of the above described repair tool for applying a coating patch the inflexible shell is configured to at least partially surround the aircraft component.

In another example of any of the above described repair tools for applying a coating patch the flexible bladder is filled with a fluid, and wherein a pressure exerted on a patch is controlled by an amount of fluid in the flexible bladder.

In another example of any of the above described repair tools for applying a coating patch the heating element is a heating blanket.

In another example of any of the above described repair tools for applying a coating patch the heating blanket is a silicon heating blanket.

Another example of any of the above described repair tools for applying a coating patch further includes at least one temperature sensor configured to detect a temperature of the heating element and at least one pressure sensor configured to detect a pressure exerted by the flexible bladder.

In another example of any of the above described repair tools for applying a coating patch each of the at least one temperature sensor and the at least one pressure sensor is communicatively coupled to the controller.

In another example of any of the above described repair tools for applying a coating patch the flexible bladder is thermally insulating.

In another example of any of the above described repair tools for applying a coating patch the flexible bladder is an air filled bladder.

In another example of any of the above described repair tools for applying a coating patch the negative space corresponds to a fan inlet case strut for a gas turbine engine.

In another example of any of the above described repair tools for applying a coating patch the heating element includes a complex curvature at a patching position.

In another example of any of the above described repair tools for applying a coating patch the complex curvature is an approximately 180 degree bend.

In another example of any of the above described repair tools for applying a coating patch the bladder includes a complex curvature at the patching position.

In another example of any of the above described repair tools for applying a coating patch the shell further defines an outgas vent path configured to allow adhesive outgassing to vent.

An exemplary method for applying a coating path includes positioning a patch over a damaged section of a component, applying heat to the patch by activating a heating element in contact with the patch, applying pressure to the patch by inflating a flexible bladder adjacent to the heating element, and maintaining a position of the flexible bladder and the heating element in an inflexible shell, the inflexible shell defining a negative space corresponding to at least the damaged section of the component.

In another example of the above described exemplary method for applying a coating path applying heat to the patch by activating the heating element in contact with the patch comprises positioning the heating element such that a bend in the heating element is in contact with the patch.

In another example of any of the above described exemplary methods for applying a coating path applying pressure to the patch by inflating the flexible bladder further comprises insulating the patch such that heat from the heating element is retained at the patch.

In another example of any of the above described exemplary methods for applying a coating path the step of applying pressure to the patch by inflating a flexible bladder adjacent to the heating element applies a pressure in the range of 25 to 30 psi (17.2 to 20.7 kpa) and applying heat to the patch comprises maintaining a temperature at the patch of approximately 300 F (149 C).

In another example of any of the above described exemplary methods for applying a coating path the steps of applying pressure to the patch and applying heat to the patch are performed for approximately 2 hours.

These and other features of the present invention can be best understood from the following specification and drawings, the following of which is a brief description.

BRIEF DESCRIPTION OF THE DRAWINGS

FIG. 4 schematically illustrates a heating element component of a repair tool.

FIG. 5 schematically illustrates a flexible bladder component of a repair tool.

FIG. 6 schematically illustrates an inflexible shell component of a repair tool.

DETAILED DESCRIPTION OF AN EMBODIMENT

Gas turbine engines, such as those utilized on commercial aircraft use a compressor to compress air, a combustor to mix the compressed air with a fuel and ignite the mixture, and a turbine section across which the resultant combustion gasses are expanded. The expansion drives the turbine section to rotate. The turbine section is connected to the compressor via one or more shaft, and the rotation of the turbine drives rotation of the compressor. Also connected to the shaft either directly, in a direct drive configuration, or through a gear system, in a geared fan configuration, is a fan. The rotation of the shaft drives rotation of the fan. The rotation of the fan, in turn, ingests air to a fan bypass duct.

Due to the ingestion of air at both the compressor and the fan, particulate that is entrained in the ambient air is frequently ingested as well. Contact between the particulate and the engine components erodes an erosion resistant coating that is applied to the components exposed to the flowpath. One such exemplary component is a fan inlet case.

Figure 1:
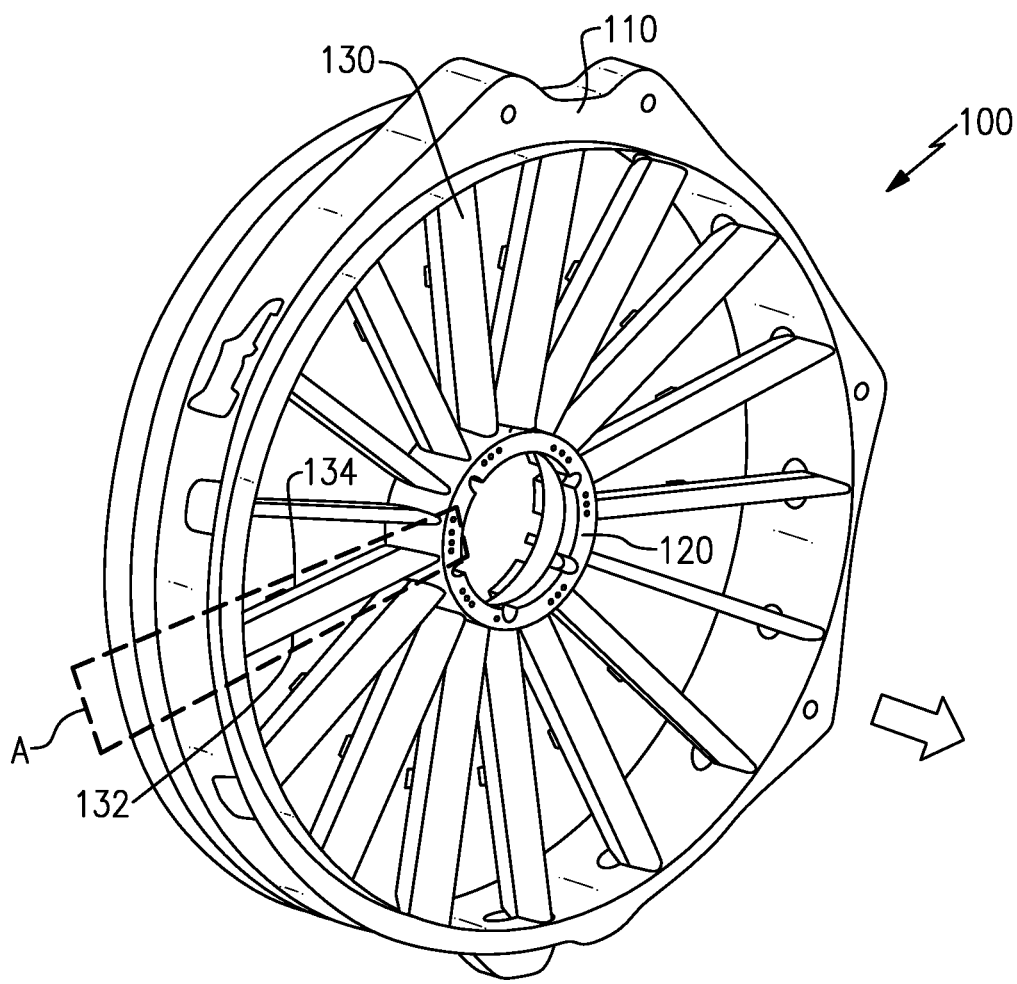
FIG. 1 schematically illustrates an exemplary fan inlet case for a gas turbine engine.

FIG. 1 schematically illustrates an exemplary fan inlet case 100. The fan inlet case 100 includes an outer support ring 110 for connecting to an outer fan nacelle, and an inner support ring 120 for connecting to an inner diameter support structure of the fan. Multiple aerodynamic struts 130 span from the inner support ring 120 to the outer support rings 110 and provide structural support to the fan nacelle when the fan inlet case 100 structure is installed in a gas turbine engine. An erosion resistant coating is applied to the surface of the fan inlet case 100. The erosion resistant coating reduces the impact of erosion during operation of the gas turbine engine.

Each of the struts 130 includes a leading edge 132 and a trailing edge 134. The leading edge 132 directly contacts the incoming air, while the trailing edge 134 has minimal contact. Further, the contact between ingested particulate is highest at the leading edge 132 of the strut 130, and gradually reduces as the contact approaches the trailing edge 134. As a result of this contact gradient, the leading edge 132 is exposed to substantially higher levels of erosion than the trailing edge 134.

Figure 2:
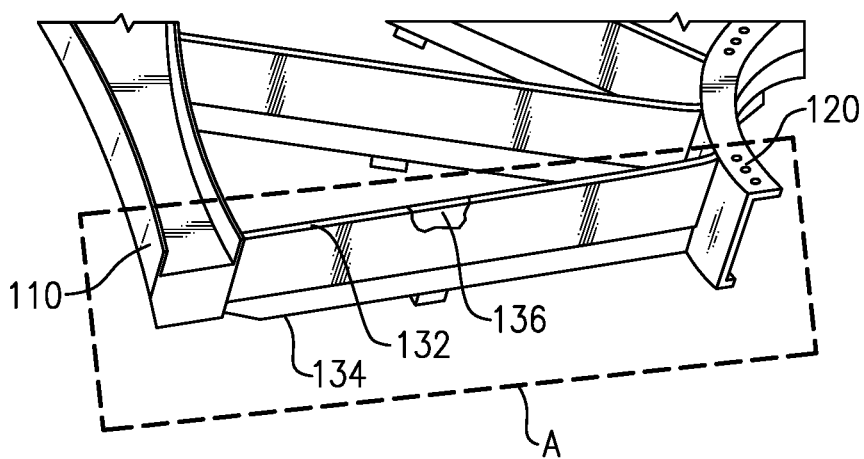
FIG. 2 schematically illustrates a single strut of the exemplary fan inlet case of FIG. 1.

With continued reference to FIG. 1, FIG. 2 schematically illustrates a zoomed in view of a single strut 130 of the fan inlet case 100 of FIG. 1. The strut 130 includes an eroded section 136 at the leading edge 132 where a portion 136 of the coating is worn, chipped, or eroded. In order to repair eroded sections of erosion resistant coatings, existing repair methods place a patch over the eroded portion 136, and apply a steady heat and pressure for a predetermined amount of time. The application of the heat and pressure causes the patch to adhere to, and integrate into the erosion resistant coating, thereby repairing the eroded portion 136.

Due to the extreme curvature of the leading edge 132, it is difficult, or impossible, to use existing methods and tools to apply the patch to the leading edge 132. While illustrated and shown herein on the fan inlet case strut, one of skill in the art having the benefit of this disclosure will appreciate that the difficulty in applying the patch extends to any component where a patch is needed at a relatively sharp angled surface, any surface that has a curvature with a substantially small radius of curvature, or any component where the damaged surface is sufficiently complex in shape and the repair tool is not limited specifically to fan inlet case strut components.

In order to apply a patch to complex surfaces via existing systems, the application of pressure and temperature is achieved by placing the entire component in an autoclave. A drawback to this application procedure is that autoclaves are expensive and large, and thus are often far removed from the site where repairs are needed. The component being repaired is shipped to an offsite location, increasing the repair time by a substantial amount.

Figure 3:
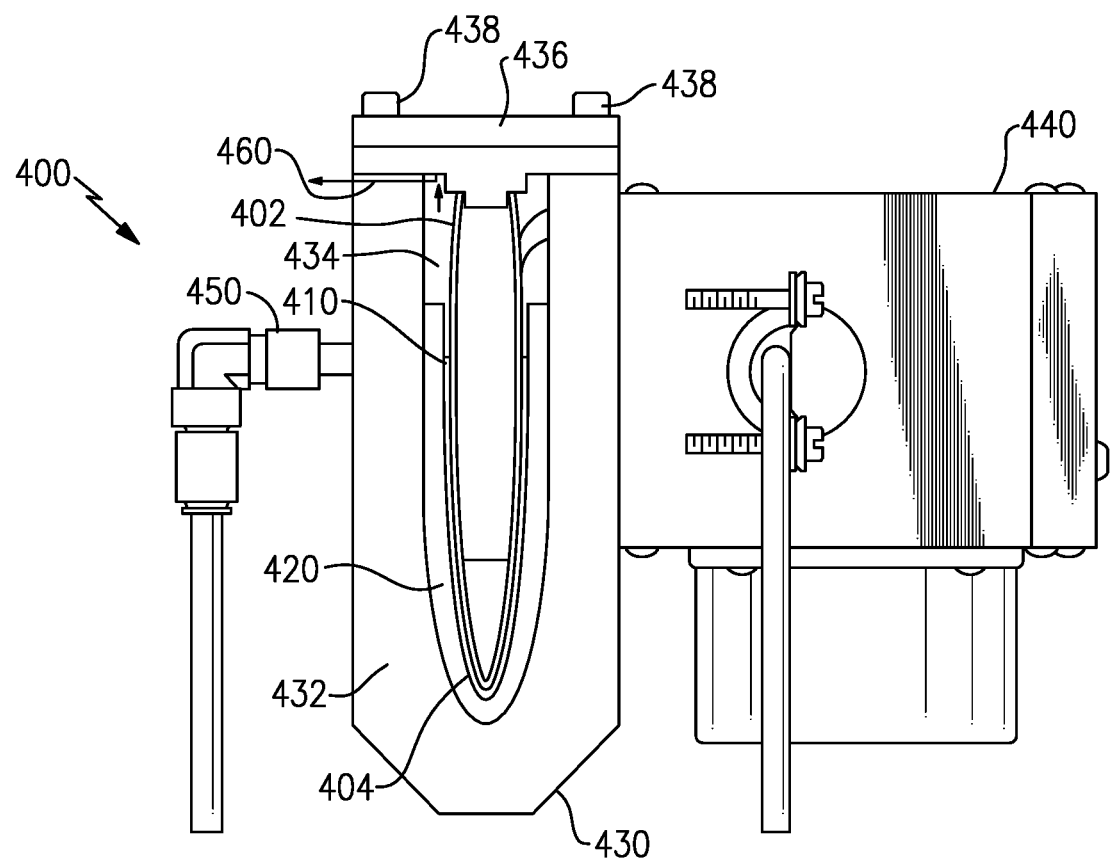
FIG. 3 schematically illustrates an assembled repair tool positioned around a fan inlet case strut.

With continued reference to FIGS. 1 and 2, FIG. 3 schematically illustrates an exemplary repair tool 400 for applying a repair patch 404 to a strut 402. The repair tool 400 is positioned about the strut 402, and includes a heating element 410, a flexible bladder 420 and an inflexible shell 430. A controller 440 is connected to the repair shell 430, and provides electrical power and controls to the repair tool 400.

An exemplary patch 404 for utilization with the repair tool 400 includes a two part erosion coating having a prefabricated film patch with an adhesive applied to one side according to a known patching technique. The adhesive side is applied to the strut 402, and pressure and heat are generated by the repair tool 400. In order to properly adhere the patch 404 to the strut 402, a steady pressure and heat is applied for an extended duration. By way of example, in one embodiment a pressure of 25-30 pounds per square inch (psi) and a temperature of approximately 300 F (149 C) should be applied for a duration of two hours in one example.

In order to achieve the desired temperature, the heating element 410 is heated and controlled by the controller 440. In some examples, a temperature sensor can be included in order to further control the temperature of the heating element 410. In alternative examples, the controller 440 can provide a constant electrical current to the heating element 410, thereby ensuring that a constant temperature is generated, and no active temperature sensing is required. In the exemplary tool 400, the heating element 410 is applied directly adjacent to the complex surface where the patch 404 is located.

In order to ensure that sufficient pressure is applied and maintained for the entire duration, the controller 440 causes the flexible bladder 420 to be inflated to a predetermined pressure. While the inflation of the flexible bladder 420 remains constant, the pressure exerted by the tool 400 on the patch 404 and the strut 402 also remains constant. The flow of air, or another inflation fluid, into the flexible bladder 420 is controlled via the controller 440 and a valve 450. In some exemplary embodiments, the pressure exerted by the flexible bladder 420 is measured via a pressure sensor disposed between the flexible bladder 420 and the heating element 410, and the amount of fluid in the flexible bladder 420 is actively controlled by the controller 440 and the valve 450. In alternative embodiments, a known amount of fluid exerts a known and constant pressure, and the controller 440 fills the flexible bladder 420 with the known amount of fluid. In the alternative embodiment, active monitoring of the pressure exerted by the flexible bladder 420 is not necessary.

At least partially surrounding the flexible bladder 420, the heating element 410, and the strut 402 is an inflexible shell 430. The inflexible shell 430 can be constructed of any rigid material. By way of example, one embodiment utilizes an aluminum material to construct the inflexible shell 430. The inflexible shell 430 includes a first portion 432 having an interior cavity defining a negative space 434. The negative space 434 defined by the interior cavity corresponds to the three dimensional shape of the complex surface to which the patch 404 is being applied.

Enclosing the negative space 434 is a clamp portion 436 that is connected to the first portion 432 of the rigid shell 430 via one or more fasteners 438 that are configured to be tightened. Once tightened to the remainder of the shell, the clamp portion 436 maintains the shell 430 in position about the strut 402, or other component to which the patch 404 is being applied.

In some examples, the patching process can generate outgasses from the adhesive bonding process. If the outgasses remain trapped within the tool 400, adhesion of the patch 404 can be reduced, or flaws can be introduced into the bonding process. In order to accommodate the outgassing, an outgassing vent 460 is included at the joint between the clamp portion 436 and the first portion 432 of the shell 430. As the pressure is applied directly via the flexible bladder 420, the lack of sealing resulting from the outgassing vent 460 does not impact the pressure exerted on the patch 404.

With continued reference to FIGS. 1-3, and with like numerals indicating like elements, FIG. 4 schematically illustrates an exemplary heating element 410. The exemplary heating element 410 is a flexible silicon heating pad. The element 410 includes an electrical lead 412 that connects to a controller and provides the electrical current for the element 410 to generate heat. Due to the flexible nature of the heating element 410, the element 410 can include a bend 414, or other contour, that matches the contour of the surface to which the patch 404 is being applied.

With continued reference to FIGS. 1-4, and with like numerals indicating like elements, FIG. 5 schematically illustrates the flexible bladder 420 of FIG. 3 isolated from the repair tool 400. The flexible bladder 420 is constructed of a flexible, thermally insulating rubber material, and is connected to a valve 450 via an inflation tube 452. As with the heating element 410, the flexible nature of the bladder 420 allows for the incorporation of a bend 424, or other curvature, that matches the curvature of the patch 404. The insulating nature of the rubber causes heat generated by the heating element 410 to be maintained at a steady temperature without requiring constant monitoring and controlling, and also forces the heat to be directly applied to the patch 404 and the strut 402.

With continued reference to FIGS. 1-5, FIG. 6 schematically illustrates the inflexible shell 430 of FIG. 3, with a remainder of the tool 400 removed. As described previously, the inflexible shell 430 defines an internal negative space 434 corresponding to the three dimensional surface of the component to which the patch 404 is being applied. The illustrated shell 430 is constructed having an internal negative space 434 conformed to a leading edge of a fan inlet case strut, and the shell 430 extends the entire length of the fan inlet case strut. In alternative examples, where alternative components are being repaired, the negative space 434 can be constructed according to the dimensions of the component being repaired.

The negative space 434 is also offset from the surface being repaired by a set amount in order to account for the presence of the heating element 410 and the flexible bladder 420. When utilized, the heating element 410 is applied to the strut, then the bladder 420 is applied directly to the heating element, and the shell 430 is slid around the strut 402, heating element 410 and the bladder 420. The shell 430 is then clamped into place via the clamping portion 436, and the application of pressure and temperature can begin.

With further reference to FIG. 3, an exemplary method for applying the coating patch 404 is described herein. Initially, the patch 404 is positioned over the damaged portion of the strut 402. Once positioned, the heating element 410 is applied directly in contact with the patch 404 and the strut 402, the flexible bladder 420 is positioned around the heating element 410, and the inflexible shell 430 is positioned about the flexible bladder 420, the heating element 410, and the strut 402. Due to the flexible nature of the heating element 410 and the flexible bladder 420, a bend in the heating element 410 and the bladder 420 is positioned adjacent a corresponding bend in both the strut 402 and the negative space 443 of the inflexible shell 430.

Once in position, heat from the heating element 410 is applied by activating the heating element 410. Simultaneously, pressure is applied by inflating the flexible bladder 420 adjacent to the heating element 410. The thermally insulating nature of the flexible bladder 420 maintains the heat from the heating element 410 at the patch 404. A controller 440 controls both the heat produced by the heating element 410 and the pressure exerted on the patch 404 by the bladder 420.

The bladder 420 and heating element 410 are maintained in position against the patch 404 within the negative space 443 defined by the inflexible shell 430, thereby ensuring that a constant temperature and pressure can be provided for the necessary duration. In one exemplary embodiment, pressure is applied in the range of 25 to 30 psi (17.2 to 20.7 kpa) and heat is applied at a temperature of approximately 300 F (149 C) for a duration of approximately two hours. One of skill in the art having the benefit of this disclosure will understand that alternative temperature and pressure ranges could be realized depending on the specific needs of a given patch and adhesive.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A repair tool for applying a coating patch comprising:
   a heating element including an approximately 180 degree bend at a patching position;
   a flexible bladder disposed adjacent the heating element;
   an inflexible shell disposed about the flexible bladder, the inflexible shell defining a negative space corresponding to a plurality of sides of an aircraft component; and
   a controller communicatively coupled to the heating element and the flexible bladder, the controller being configured to control a temperature of the heating element and a pressure of the flexible bladder.

2. The repair tool of claim 1, wherein the inflexible shell is configured to at least partially surround the aircraft component.

3. The repair tool of claim 1, wherein the flexible bladder is filled with a fluid, and wherein a pressure exerted on the coating patch is controlled by an amount of fluid in the flexible bladder.

4. The repair tool of claim 1, wherein the heating element is a heating blanket.

5. The repair tool of claim 4, wherein the heating blanket is a silicon heating blanket.

6. The repair tool of claim 1, further comprising at least one temperature sensor configured to detect the temperature of the heating element and at least one pressure sensor configured to detect the pressure exerted by the flexible bladder.

7. The repair tool of claim 6, wherein each of the at least one temperature sensor and the at least one pressure sensor is communicatively coupled to the controller.

8. The repair tool of claim 1, wherein the flexible bladder is thermally insulating.

9. The repair tool of claim 1, wherein the flexible bladder is an air filled bladder.

10. The repair tool of claim 1, wherein the negative space corresponds to a fan inlet case strut for a gas turbine engine.

11. The repair tool of claim 1, wherein the flexible bladder includes an approximately 180 degree bend at the patching position.

12. The repair tool of claim 1, wherein the inflexible shell further defines an outgas vent path configured to allow adhesive outgas sing to vent.

\* \* \* \* \*